US012106684B2

(12) United States Patent
Dantonello et al.

(10) Patent No.: US 12,106,684 B2
(45) Date of Patent: Oct. 1, 2024

(54) FILM COMPOSITE WITH PROTECTION AGAINST TAMPERING

(71) Applicant: Schreiner Group GmbH & Co. KG, Oberschleissheim (DE)

(72) Inventors: Katharina Dantonello, Munich (DE); Bernhard Schirdewahn, Munich (DE); Sebastian Dick, Munich (DE); Mark Walter, Unterschleissheim (DE); Jens Vor Der Brueggen, Munich (DE)

(73) Assignee: Schreiner Group GmbH & Co. KG, Oberschleissheim (DE)

(*) Notice: Subject to any disclaimer, the term of this patent is extended or adjusted under 35 U.S.C. 154(b) by 4 days.

(21) Appl. No.: 17/743,721

(22) Filed: May 13, 2022

(65) Prior Publication Data

US 2022/0398944 A1 Dec. 15, 2022

(30) Foreign Application Priority Data

Jun. 9, 2021 (DE) ..................... 10 2021 114 841.3

(51) Int. Cl.
*G09F 3/00* (2006.01)
*G09F 3/10* (2006.01)

(52) U.S. Cl.
CPC .............. *G09F 3/0292* (2013.01); *G09F 3/10* (2013.01)

(58) Field of Classification Search
CPC ................................ G09F 3/10; G09F 3/0292
See application file for complete search history.

(56) References Cited

U.S. PATENT DOCUMENTS

| | | | | |
|---|---|---|---|---|
| 6,066,437 | A | 5/2000 | Koesslinger | |
| 6,815,147 | B2 | 11/2004 | Fischer | |
| 2004/0048172 | A1* | 3/2004 | Fischer | B41M 5/24 156/239 |
| 2006/0201041 | A1* | 9/2006 | Ehrmann | H01M 50/129 428/411.1 |
| 2011/0018253 | A1 | 1/2011 | Birsztejn et al. | |
| 2019/0147775 | A1 | 5/2019 | Walter | |

FOREIGN PATENT DOCUMENTS

| | | | | |
|---|---|---|---|---|
| DE | 200 17 501 | U1 | 12/2000 | |
| DE | 10 2016 108 216 | A1 | 11/2017 | |
| EP | 0 866 750 | A1 | 9/1998 | |
| EP | 1 522 984 | A2 | 4/2005 | |
| WO | 98/16397 | A1 | 4/1998 | |
| WO | WO-9922349 | A1 * | 5/1999 | B42D 15/025 |
| WO | 2009/097980 | A2 | 8/2009 | |

OTHER PUBLICATIONS

WO 99/22349A1 Machine Translation via WIPO (Year: 1999).*
German Search Report dated Jan. 13, 2022 in German Application No. 10 2021 114 841.3 with English translation of the relevant parts.

* cited by examiner

*Primary Examiner* — Laura C Powers
(74) *Attorney, Agent, or Firm* — Collard & Roe, P.C.

(57) ABSTRACT

A film composite with protection against tampering includes a base film, which is arranged as the lowermost layer in the film composite, and a cover layer, which is arranged as the uppermost layer in the film composite. The film composite further includes an intermediate film, which is arranged between the base film and the cover layer, and a laser-inscribable layer, which is arranged in the film composite between the base film and the intermediate film. Lines of weakening are provided in the film composite, which run within the base film and within the intermediate film.

11 Claims, 4 Drawing Sheets

FILM COMPOSITE WITH PROTECTION AGAINST TAMPERING

CROSS REFERENCE TO RELATED APPLICATIONS

Applicant claims priority under 35 U.S.C. § 119 of German Application No. 10 2021 114 841.3 filed Jun. 9, 2021, the disclosure of which is incorporated by reference.

BACKGROUND OF THE INVENTION

1. Field of the Invention

The invention relates to a film composite with protection against tampering, into which a marking can be introduced with the aid of a laser beam.

2. Description of the Related Art

Labels are commonly used to identify a variety of products. A label comprises a film composite with a writable film for the insertion of a marking. The label is usually applied to the object to be marked by means of an adhesive coating. Due to the flexible material properties of the film composite, a label can be applied to differently shaped objects.

Many products have to be provided with tamper-proof labelling. These include, for example, type designations in the automotive sector that clearly identify a specific vehicle, or environmental badges that assign the vehicle to a specific pollutant emission group. Such markings have a documentary character and should therefore be designed to be tamper-proof.

In order to avoid that the documentary markings are successfully manipulated, it must be ensured that it is almost impossible for a forger to detach the film composite with the documentary character from a substrate to which the film composite is stuck and to transfer it to another object without the counterfeit being detected. As a precaution, any attempt to tamper with a label should result in the destruction of the film composite so that any misuse due to tampering with the film composite can be ruled out.

SUMMARY OF THE INVENTION

It is therefore desirable to provide a tamper-evident film composite that has a reliable self-destruct mechanism that is actuated in the event of a tampering attempt.

A film composite with protection against tampering, in which it is ensured that the film composite is reliably destroyed in the event of an attempt at tampering, is disclosed in accordance with the invention herein.

The film composite with protection against tampering comprises a base film, which is arranged as the lowermost layer in the film composite, and a cover layer, which is arranged as the uppermost layer in the film composite. In addition, the film composite has an intermediate film disposed between the base film and the cover layer. Furthermore, the film composite comprises a laser-inscribable layer, which is arranged in the film composite between the base film and the intermediate film. Lines of weakening are provided in the film composite, which run within the base film and within the intermediate film.

Lines of weakening are to be understood in particular as interruption lines, i.e. lines along the course of which a film or film layer is cut through its entire thickness or at least partially through its thickness. Lines of weakening can, for example, take the form of punching or chamfering lines or also cuts, perforations, grooves or the like.

The lines of weakening can extend continuously in the film composite from the base film into the intermediate film. The lines of weakening thus also run within the laser-inscribable layer. The lines of weakening can be formed in the material of the base film, the laser-inscribable layer and the intermediate film in such a way that, when manipulated, the lines of weakening form predetermined breaking points at which the film composite is destroyed during a detachment attempt.

According to an advantageous embodiment of the film composite, the cover layer has no lines of weakening. The cover layer can be applied to the upper side of the intermediate layer with the aid of an adhesive layer, for example a transfer adhesive. The cover layer can be embodied as a cover laminate layer, in particular as a foil/cover laminate film.

By providing the top layer over the weakened film layers, the film composite has sufficient stability to be placed reliably on an object to be labelled. On the other hand, the application of the lines of weakening in all of the film layers arranged under the cover layer ensures that the film composite is reliably destroyed in the event of a manipulation attempt, for example in the event of a peel-off attempt.

The unweakened cover layer allows the lines of weakening to extend completely through the other layers, i.e. in particular the base film, the intermediate film and the information-bearing laser-inscribable layer. The arrangement of the base film, the intermediate film and the laser-inscribable layer under the cover layer can, for example, be completely punched through by the provision of the unweakened cover layer. Nevertheless, the film composite has sufficient stability to adhere the film composite to an object by means of an adhesive layer arranged on an underside of the base film.

According to one possible embodiment, the adhesive force of the adhesive layer located between the intermediate film and the cover layer may be such that the cover layer can be easily peeled off from the intermediate film. To facilitate the peeling of the cover layer from the intermediate foil, the cover layer may be embodied, for example, as a foil with a grip tab.

In this embodiment, the cover layer is relatively easy to detach from the other film layers of the film composite during manipulation. After peeling off the top layer, a completely weakened material, for example a completely punched film composite, remains on the labelled component. In the event of a peel-off attempt, the weakened lines in the base film, the intermediate film and the laser-inscribable layer inevitably lead to a separation of the individual layers, so that a manipulation attempt without destroying the film composite is nearly impossible. The label or film composite can ultimately only be removed from a substrate in segments.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
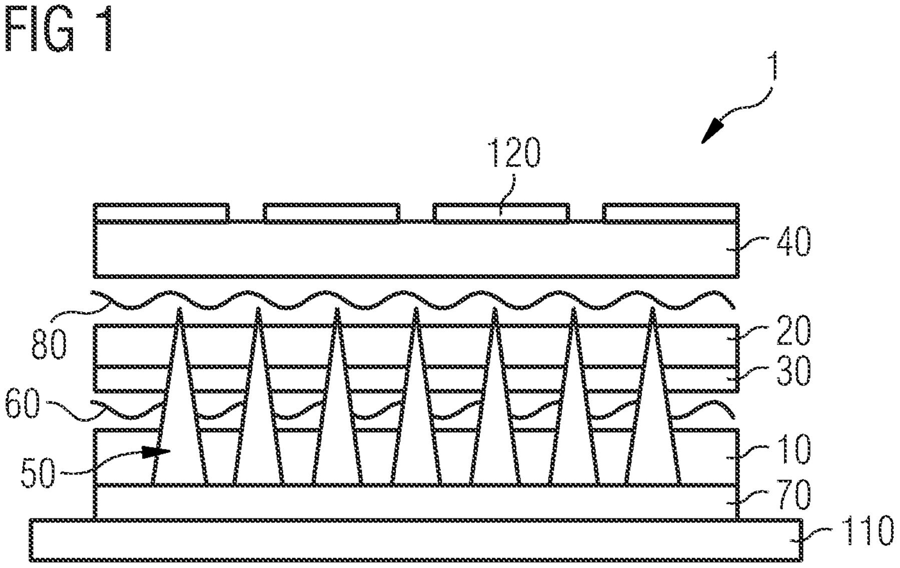
FIG. 1 shows a cross-section through an embodiment of a film composite with protection against tampering.

A schematic structure of a first embodiment of a film composite 1 with protection against manipulation is shown in cross-section in FIG. 1. The film composite 1 comprises a base film 10, which is arranged as the lowest layer in the film composite. Furthermore, the film composite has an intermediate film 20 and a laser-inscribable layer 30. The laser-inscribable layer 30 is arranged in the film composite between the base film 10 and the intermediate film 20.

The base film 10 may be formed as a white colored film. The intermediate film 20 may be a transparent film. The base film 10 and the intermediate film 20 can each be formed as a layer of plastic, preferably polyethylene (PE), polyethylene terephthalate (PET) or polyvinyl chloride (PVC).

The laser-inscribable layer 30 may be formed as a metallic layer that is ablatable by exposure to a laser beam. By "ablatable" it is to be understood that the laser-inscribable layer is ablated or destroyed by the action of a laser beam, in particular by the thermal energy of the laser beam, so that it loses its opacity. The laser-inscribable layer 30 may, for example, take the form of an aluminum layer/aluminum metallization. It may have a thickness of less than 3 μm, in particular a thickness between 0.1 μm to 0.4 μm.

The laser-inscribable layer 30 can have a coloring, for example a black coloring. When a marking is applied to the film composite with the aid of a laser, the laser-inscribable layer 30 is removed at certain areas on the underside of the intermediate film 20, so that the underlying base film 10 becomes visible.

The laser-inscribable layer 30 can be arranged on an underside of the intermediate film 20 facing the base film 10. The laser-inscribable layer 30 can be applied to the underside of the intermediate film 20, for example, by means of a vapor deposition or sputtering process.

The film composite further comprises a cover layer 40, which is arranged as the uppermost layer in the film composite 1. The cover layer 40 can be embodied as a cover laminate. In particular, the cover layer 40 can be a film, for example made of PU, PE or PET. According to another embodiment, the cover layer 40 may be formed as an easily breakable film, for example as an acrylate film. According to another embodiment, the cover layer 40 may be formed as a printable layer/printed layer.

The cover layer 40 may be printed on an upper surface facing away from the intermediate film 20. Optionally, the cover layer 40 may have a scatter print 120 visible in FIG. 1 on its upper side.

The intermediate film 20 is arranged between the base film 10 and the cover layer 40. An adhesion layer 80 may be arranged between the intermediate film 20 and the cover layer 40 to bond the intermediate film 20 to the cover layer 40. For bonding the base film 10 and the intermediate film 20, the film composite 1 comprises a bonding layer 60 arranged between the base film 10 and the intermediate film 20. The bonding layer 60 can, for example, be a transfer adhesive. Another possibility is to coat the base film 10 directly with the bonding layer 60.

The film composite 1 may further comprise an adhesive layer 70 arranged on an underside of the base film 10 facing away from the intermediate film 20. The adhesive layer 70 is configured for adhering the film composite 1 to a substrate. To protect the adhesive layer 70, the film composite 1 may have an adhesive-repellent carrier film/liner 110.

As can be seen from the cross-section of the film composite 1 in FIG. 1, lines of weakening 50 are provided in the film composite which extend within the base film 10 and within the intermediate film 20. The lines of weakening 50 can be formed, for example, as punching lines, perforations, etc.

The lines of weakening 50 can extend continuously through all layers below the cover layer 40 or adhesion layer 80 in the film composite 1. In particular, the lines of weakening 50 extend from an underside of the base film 10 through the base film 10, the bonding layer 60, the laser-inscribable layer 30 and the intermediate film 20. Only the cover layer 40 and the adhesion layer 80 do not have any lines of weakening 50 and thus represent unweakened/undamaged layers within the film composite.

Due to the provision of lines of weakening 50 in all layers of the film composite below the cover layer 40 or below the adhesion layer 80, the entire film composite 1 is weakened in such a way that it destroys itself in the event of a manipulation attempt, in particular in the event of an attempt to pull the film composite off a substrate.

On the other hand, due to the unweakened top layer of the cover layer 40, the film composite has sufficient stability to be stuck reliably and without destruction onto an object. At the same time, the cover layer 40 makes it possible to completely weaken or punch through all the layers of the film composite that lie under the cover layer 40 or the adhesion layer 80, i.e. in particular also the information-bearing layers. By providing the cover layer/cover laminate 40, a requirement for the durability can be guaranteed, although at the same time the information-bearing layer 20, 30 is completely severed/punched through.

Figure 2B:
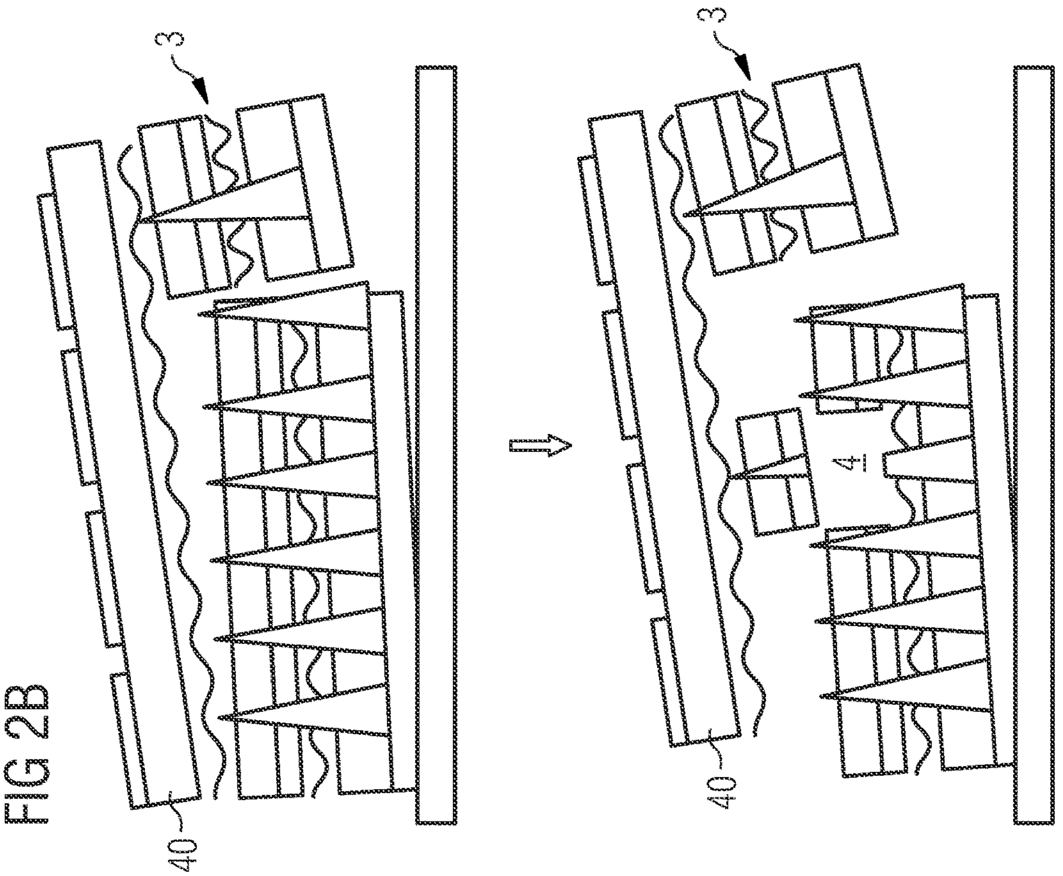
FIG. 2A and FIG. 2B show a self-destruction mechanism of a tamper-evident film laminate when attempting to remove the film laminate from a substrate.
Figure 2A:
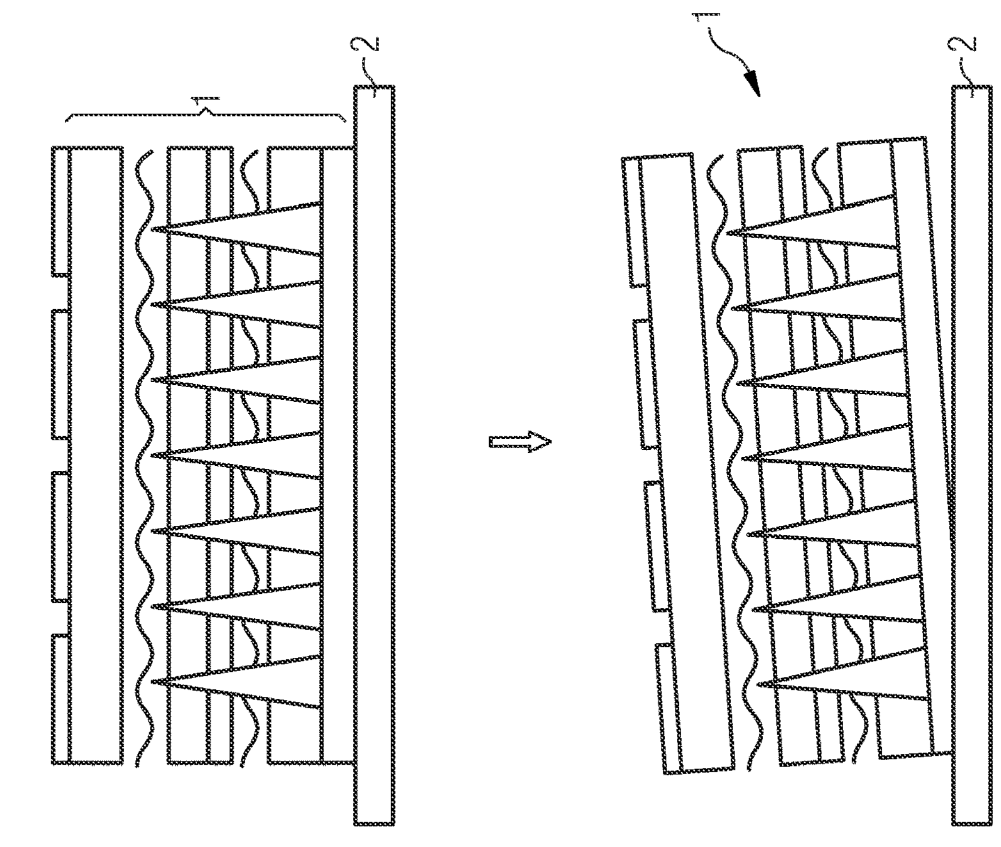

FIGS. 2A and 2B illustrate a self-destruction mechanism of the film laminate 1 when attempting to detach the film laminate from an adhesive base/object 2. FIG. 2A shows in the upper picture the film laminate 1 glued to the object 2 in the form of a glued label. In the lower picture of FIG. 2A it can be seen how the lower adhesive layer is peeled off in order to lift the film composite 1 from the substrate 2.

Due to the lines of weakening in the layers below the top layer, there are predetermined breaking areas in the lower layers. If a counterfeiter tries to detach the film composite 1 from the adhesive base 2, individual parts of the completely weakened, for example punched-through, material break out of the film composite under the unweakened cover layer 40.

As can be seen in FIG. 2B in the upper image, individual segments 3 from the adhesive layer, the base film, the bonding layer, the laser-inscribable layer and the intermediate film can adhere to the detached cover layer, while other sections of the base film, the intermediate film and the laser-inscribable layer remain on the adhesive base. Depending on the adhesive base, the continuously weakened layers of the base film 10, the intermediate film 20 and the laser-inscribable layer 30 can thus lead to a complete removal of individual punching elements from the film composite, resulting in holes in the film composite.

As can be seen in the lower image of FIG. 2B, individual segments 4 from the intermediate film and the inscribable layer can also lift off the base film and break out of the film composite. The segment 4 from the intermediate film and the laser-inscribable layer remains adhered to the cover layer 40 when attempting to lift the film composite 1 from the adhesive base 2, while the underlying base film remains adhered to the object 2.

Even if it should be possible to lift the unweakened cover layer 40 from the film composite, a completely weakened/punched material comprising the base film 10, the intermediate film 20 and the laser-inscribable layer 30 remains on the labelled object 2 after the cover layer 40 has been removed, which can only be removed in segments.

In addition to the weakening of the film composite 1 by the lines of weakening 50, the adhesion between the base film 10 and the intermediate film 20 is additionally weakened by the inscription introduced into the laser-markable layer 30 in the form of the laser marking. Depending on the inscription, a manipulation of the film composite can thus additionally lead to a separation between these layers.

Figure 3A:
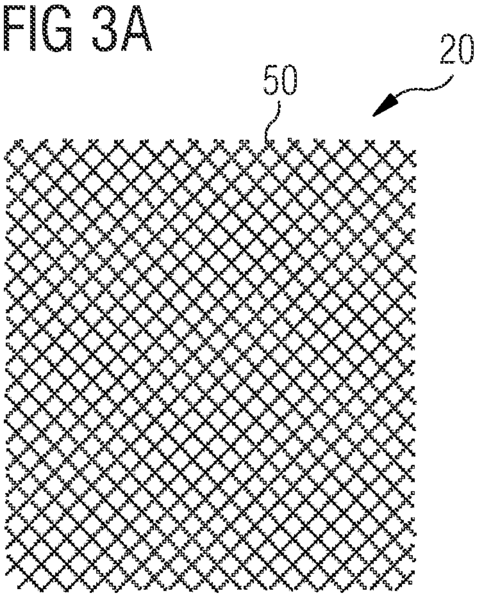
FIG. 3A shows a top view of an intermediate film of a tamper-evident laminate having a first configuration of contours of lines of weakening.
Figure 3B:
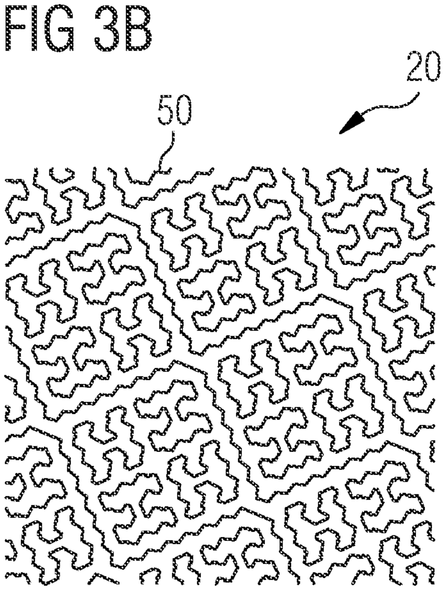
FIG. 3B shows a top view of an intermediate film of a film composite with protection against tampering with a second configuration of contours of lines of weakening.

The lines of weakening 50 may be introduced into the film composite 1 in such a way that, when viewed from above on a side of the intermediate film 20 facing the cover layer 40, they form a diamond-shaped pattern, as shown in FIG. 3A, or an H-shaped pattern (H-punch), as shown in FIG. 3B. In an advantageous embodiment, the length of a weakening line/punching line in plan view of the intermediate film 20 up to a change of direction can be between 3 mm and 7 mm, in particular approx. 5 mm. This means that in a diamond-shaped pattern of the lines of weakening, the side length of each diamond is between 3 mm and 7 mm, for example 5 mm.

In particular, the number of predetermined breaking zones can be significantly increased by introducing H-shaped lines of weakening into the film composite. The right-angled contact of the lines of weakening/punching results in force peaks at which the material is easily destroyed during an attempt at manipulation.

The proposed structure of the film laminate 1 also enables the film laminate to be bonded on narrow radii, as the line of force for transmitting restoring forces is interrupted by the closely arranged lines of weakening/punching lines to the next pixel. The flexible upper adhesion layer 80 between the intermediate film 20 and the cover layer 40 also allows pixels to move individually in a kind of "ice-slab-like" manner, thereby absorbing the restoring forces therein. The film composite 1 can thus be adhered to radii of, for example, 1 cm-1.5 cm and thus, for example, to pipes with a small diameter.

In the following, further embodiments of the film composite 1 are explained in more detail with reference to FIGS. 4 to 7.

Figure 4:
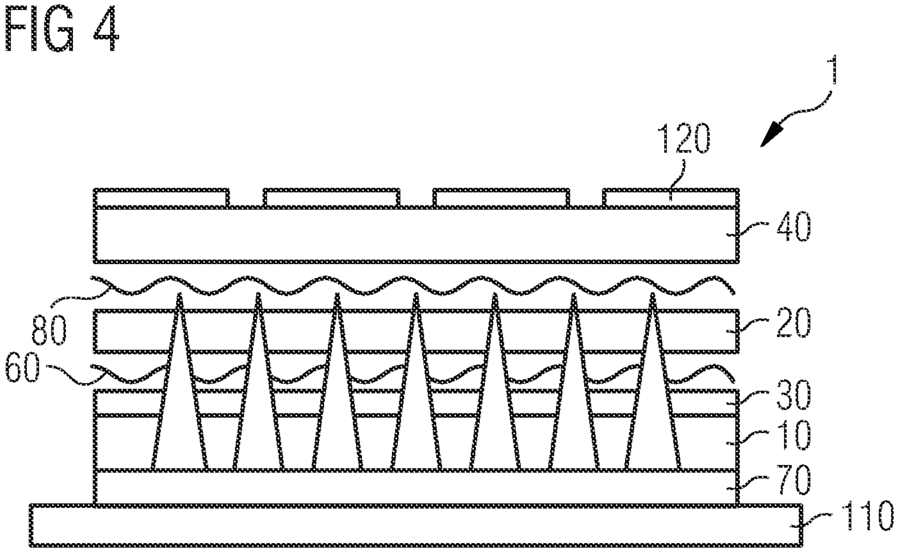
FIG. 4 shows a further embodiment of a tamper-evident film composite with a laser-inscribable layer on a base film of the film composite.

FIG. 4 shows an embodiment of the film composite 1 in which the laser-inscribable layer 30 is arranged on an upper side of the base film 10 facing the intermediate film 20. In this embodiment of the film composite, the adhesive force of the bonding layer 60 can be selected in such a way that the laser-inscribable layer 30 remains on the base film 10 during a peel-off attempt, even if the intermediate film 20 lifts off the base film 10 during a manipulation attempt.

As in the embodiment of the film composite shown in FIG. 1, in which the laser-inscribable layer 30 is arranged on an underside of the intermediate film 20 facing the base film 10, the laser-inscribable layer 30 can be in the form of an aluminum layer/aluminum metallization which is applied to the upper side of the base film 10, for example, by a vapor deposition or sputtering process.

Figure 5:
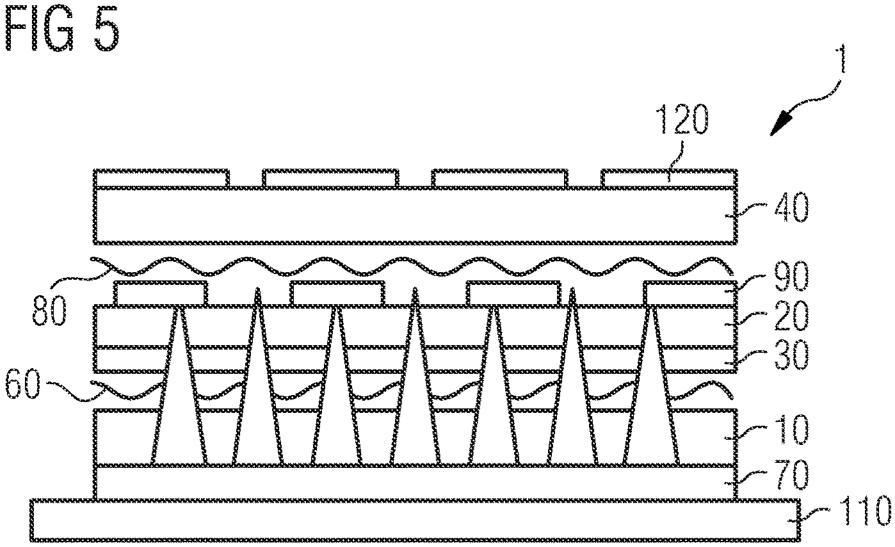
FIG. 5 shows a further embodiment of a film composite with protection against tampering with a printed layer partially arranged on an intermediate film.

FIG. 5 shows another embodiment of the film composite 1 with a printing layer 90, which is arranged on an upper side of the intermediate film 20 facing the cover layer 40. In this embodiment, the printing layer 90 can be formed to strengthen or weaken the adhesion between the intermediate film 20 and the cover layer 40. The printing layer 90 thus enables a partial and controlled weakening or strengthening of the adhesive force of the cover layer 40. The printing layer 90 can be configured as an adhesive killer for weakening the adhesive force between the intermediate film 20 and the cover layer 40 or as a primer lacquer for strengthening the adhesive force.

The printing layer 90 can be arranged on the intermediate film 20 as a structured layer either diffusely, for example in the form of guilloches, or precisely matching the punching geometry, for example in a chequerboard pattern in the case of a diamond-shaped punching or comparable punching geometries. In this way, the separation pattern from the lower layers can be applied to the film structure in a targeted manner.

Figure 6:
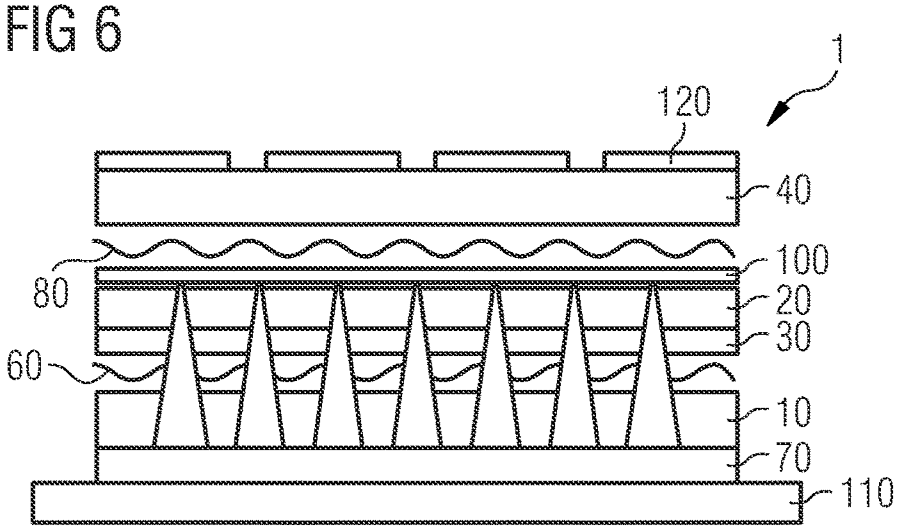
FIG. 6 shows a further embodiment of a film composite with protection against manipulation with a protective layer arranged on an intermediate film.

FIG. 6 shows a further embodiment of the film composite 1 with a protective layer 100, which is arranged as a continuous or uninterrupted layer on an upper side of the intermediate film 20 facing the cover layer 40 and serves to protect the film layers lying underneath. The protective layer 100 may, for example, be configured to protect the film structure of the base film 10 and the intermediate film 20 as well as the laser-inscribable layer 30 arranged below the protective layer 100 from penetration by substances such as battery acid. In this embodiment, the adhesive force of the adhesion layer 80 may be such that the cover layer 40 is as easily removable as possible.

Figure 7:
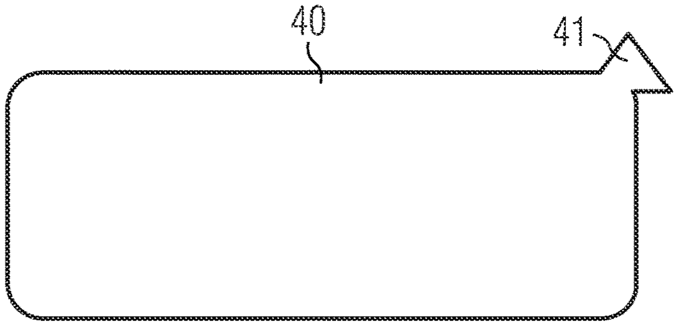
FIG. 7 shows a top view of a cover film of a film composite with protection against tampering with a grip tab.

In all of the embodiments of the film composite 1 shown in the figures, the cover layer 40 may be formed as a film layer with a grip tab 41 for peeling off the cover layer 40 from the intermediate film 20. A corresponding design of the cover layer/film layer 40 is shown in FIG. 7. The tab 41 can be formed as a lasered tab with a design that is adapted to the punch layout. In this case, it is possible to laser a tab for each film composite by means of an adapted laser design.

The cover layer 40 can be removed directly after application of the film laminate 1 to an object with the aid of the grip tab 41. After peeling off the top layer 40, the assembly of the weakened film layers 10 and 20 and the laser-inscribable layer 30 remains on the labelled object and can only be removed in segments. Particularly when manipulated with heat treatment, for example with a hair dryer, the self-destruction mechanism reliably activates with this variant of the film composite.

So that the cover layer 40 can be removed from the other layers directly after application of the film composite, the adhesive force of the adhesion layer 80 between the cover layer 40 and the laminate of the base film 10, the intermediate film 20 and the laser-inscribable layer 30 can be configured in such a way that the adhesive force of the adhesion layer 80 is as low as possible. In particular, the adhesion layer 80 may be configured such that the adhesive force of the adhesion layer 80 to the intermediate film 20 is lower than the adhesive force to the cover layer 40.

Furthermore, the adhesion layer 80 can be formed in such a way that the adhesive force of the adhesion layer 80 to the cover layer 40 is lower than the adhesive force of the bonding layer 60 to the base film 10 and to the intermediate film 20 or is lower than the adhesive force of the adhesive layer 70 to a substrate. As a result, the cover layer 40 can be lifted off the film composite after the film composite has been applied to an adhesive substrate, leaving the remaining layers of the film composite on the labelled article. Thus, only a completely punched film structure remains on a substrate, which again significantly increases the fragility of the film composite.

In order to counteract any possible poor durability of the film composite, the cover layer 40 can be embodied as a lacquer layer instead of a film, which is applied directly to the upper side of the intermediate film 20. The lacquer layer can be applied to the upper side of the intermediate film 20 either before the weakening lines are applied, for example before a punching process, or after the weakening lines have been applied or after punching. The latter manufacturing variant has the advantage that a punching contour can be levelled by the lacquer and the visibility of the punching contour can thus be reduced.

Although only a few embodiments of the present invention have been shown and described, it is to be understood that many changes and modifications may be made thereunto without departing from the spirit and scope of the invention.

LIST OF REFERENCE SIGNS

1 film laminate
2 object to be labelled/adhesive base
10 base film
20 intermediate film
30 laser-inscribable layer
40 cover layer
41 grip tab
50 lines of weakening
60 bonding layer
70 adhesive layer
80 adhesion layer
90 printing layer
100 protective layer
110 carrier film/liner
120 scatter print

What is claimed is:

1. A tamper-evident film composite comprising:
a base film;
a cover layer disposed in the film composite as the uppermost layer;
an intermediate film arranged between the base film and the cover layer;
a laser-inscribable layer which is arranged in the film composite between the base film and the intermediate film; and
an adhesion layer disposed between the intermediate film and the cover layer for bonding the intermediate film to the cover layer;
wherein lines of weakening are provided in the film composite which extend within the base film and within the laser-inscribable layer and within the intermediate film and;
wherein, the adhesion layer is formed such that an adhesive force of the adhesion layer to the intermediate film is lower than an adhesive force of the adhesion layer to the cover layer.

2. The film composite according to claim 1, wherein the lines of weakening extend within the laser-inscribable layer.

3. The film composite according to claim 1, wherein the cover layer has no lines of weakening.

4. The film composite according to claim 1, wherein the lines of weakening form an H-shaped or diamond-shaped pattern when viewed from above on a side of the intermediate film facing the cover layer.

5. The film composite according to claim 1, wherein the lines of weakening are embodied as punching lines.

6. The film composite according to claim 1, further comprising:
a bonding layer disposed between the base film and the laser-inscribable layer and embodied for bonding the base film and the laser-inscribable layer; and
an adhesive layer which is arranged on an underside of the base film facing away from the intermediate film and is embodied for adhering the film composite to a substrate.

7. The film composite according to claim 1, wherein an upper side of the cover layer facing away from the intermediate film is printed upon.

8. The film composite according to claim 1, wherein the cover layer is embodied as a film or a printable layer.

9. The film composite according to claim 1, further comprising:
a printing layer partially arranged on an upper side of the intermediate film facing the cover layer.

10. The film composite according to claim 1, further comprising:
a protective layer disposed on an upper surface of the intermediate film facing the cover layer.

11. The film composite according to claim 1, wherein the cover layer is embodied as a film layer with a grip tab for pulling the cover layer off the intermediate film.

* * * * *